(12) United States Patent
Koolen et al.

(10) Patent No.: US 12,459,394 B2
(45) Date of Patent: Nov. 4, 2025

(54) ELECTRICAL VEHICLE CHARGING SYSTEM FOR PREVENTING OF SIMULTANEOUS CLOSING OF OUTLET CONTACTORS

(71) Applicant: ABB E-mobility B.V., Delft (NL)

(72) Inventors: Gertjan Koolen, Eindhoven (NL); Jim Van-Der-Heijden, Eindhoven (NL)

(73) Assignee: ABB E-Mobility B.V., Delft (NL)

( * ) Notice: Subject to any disclaimer, the term of this patent is extended or adjusted under 35 U.S.C. 154(b) by 850 days.

(21) Appl. No.: 17/725,489

(22) Filed: Apr. 20, 2022

(65) Prior Publication Data

US 2022/0242269 A1     Aug. 4, 2022

Related U.S. Application Data

(63) Continuation of application No. PCT/EP2020/079736, filed on Oct. 22, 2020.

(30) Foreign Application Priority Data

Oct. 22, 2019  (EP) .................................... 19204597

(51) Int. Cl.
 *B60L 53/67* (2019.01)
 *B60L 53/14* (2019.01)
 (Continued)

(52) U.S. Cl.
 CPC ............... *B60L 53/67* (2019.02); *B60L 53/14* (2019.02); *B60L 53/60* (2019.02);
 (Continued)

(58) Field of Classification Search
 USPC ........................................................ 320/109
 See application file for complete search history.

(56) References Cited

U.S. PATENT DOCUMENTS

| | | | |
|---|---|---|---|
| 2004/0000909 | A1 | 1/2004 | Kablaoui et al. |
| 2016/0009189 | A1 | 1/2016 | Yoshizawa et al. |
| 2020/0336003 | A1* | 10/2020 | Narla ............... H02J 9/062 |

FOREIGN PATENT DOCUMENTS

| | | |
|---|---|---|
| CN | 103828181 A | 5/2014 |
| CN | 104810894 A | 7/2015 |

(Continued)

OTHER PUBLICATIONS

European Patent Office, International Search Report in International Patent Application No. PCT/EP2020/079736, 4 pp. (Jan. 25, 2021).

(Continued)

*Primary Examiner* — Bryce M Aisaka
(74) *Attorney, Agent, or Firm* — McCarter & English, LLP (57) ABSTRACT

A system and method for electrical vehicle charging includes a plurality of outlets, at least one parallelization switch, a guarding wire running in parallel along a DC path formed by outlet switches and at least one parallelization switch and comprising a plurality of outlet guarding switches, a plurality of current sensors, a plurality of voltage sources and at least one parallelization guarding switch, and a control device connected to the current sensors. Each voltage source, current sensor and outlet guarding switch is associated to each one outlet. Each outlet guarding switch is associated to one outlet switch. The control device is configured for opening at least one of the outlet switches and/or the at least one parallelization switch when at least one of the current sensors measures a current greater than zero.

15 Claims, 4 Drawing Sheets

(51) Int. Cl.
*B60L 53/60* (2019.01)
*G01R 19/00* (2006.01)
*H02H 7/20* (2006.01)
*H02J 1/10* (2006.01)

(52) U.S. Cl.
CPC ........... *G01R 19/0092* (2013.01); *H02H 7/20* (2013.01); *H02J 1/102* (2013.01)

(56) References Cited

FOREIGN PATENT DOCUMENTS

| | | |
|---|---|---|
| CN | 107128178 A | 9/2017 |
| CN | 107364353 A | 11/2017 |
| DE | 2607622 A1 | 9/1977 |
| DE | 102021204455 A1 | 11/2022 |
| EP | 0644079 A2 | 3/1995 |
| GB | 2479418 A | 10/2011 |
| JP | 2005-65433 A | 3/2005 |
| JP | 2015-230784 A | 12/2015 |
| WO | WO 2018/158460 A1 | 9/2018 |

OTHER PUBLICATIONS

European Patent Office, Written Opinion in International Patent Application No. PCT/EP2020/079736, 14 pp. (Jan. 25, 2021).
Sun, "Development of a charging timed power-off socket for electric vehicles based on the frequency division principle," *Agricultural Machinery Use and Maintenance*, 5: 2 pp. (May 16, 2019).

\* cited by examiner

ELECTRICAL VEHICLE CHARGING SYSTEM FOR PREVENTING OF SIMULTANEOUS CLOSING OF OUTLET CONTACTORS

CROSS-REFERENCE TO RELATED APPLICATIONS

This patent application claims priority to International Patent Application No. PCT/EP2020/079736, filed on Oct. 22, 2020, which claims priority to European Patent Application No. 19204597.9, filed on Oct. 22, 2019, both of which are incorporated herein in their entirety by reference.

FIELD OF THE DISCLOSURE

The present disclosure relates to the field of electric vehicle charging systems and methods.

BACKGROUND OF THE INVENTION

Electrical vehicle charging systems are known from prior art and usually comprise an outlet for connecting an electrical vehicle for charging a battery of the electrical vehicle and a switch for switching on respectively off the outlet respectively its port. Protection of such electrical vehicle charging systems with multiple outlets and dynamic power routing against parallel connection of two or more electrical vehicle batteries is a crucial goal for maintenance and operation of the electrical vehicle charging system.

In case control software fails or direct current, DC, contactors as switches become welded, the electrical vehicle charging system should detect such event and prevent shorting a DC bus between battery terminals of two electrical vehicles. If in case of parallel battery connection, a charging current increases to a level exceeding a maximum battery current ratings, overloading, overheating, boiling of the battery, and frequently battery explosion may happen. Therefore, there is a general need for DC contactors monitoring and apart from safety preventing the electrical vehicle and a respective electrical vehicle charging system from any damage, in particular in order to determine whether the contactor is welded in such case resulting in an unsafe system.

Prior art describes various possibilities for welding detection, for example providing an auxiliary contact, which is an expensive solution. Alternatively, a leakage current to protective earth, PE, can be measured, which is also a complex solution that depends very much on the environment. Measuring a coil inductance is another complex and less reliable solution. In sum, there is no cheap, reliable and continuous solution known from prior art to detect welded contactors, in order to fulfil safety requirements, for example in the US and Europe to detect whether a contactor has a welding fault.

BRIEF SUMMARY OF THE INVENTION

The invention relates to an electrical vehicle charging system comprising a plurality of power stages each configured for providing electrical energy to charge an electrical vehicle, a plurality of outlets each comprising an outlet switch con-figured for connecting the electrical vehicle to the respective power stage for charging the electrical vehicle, and at least one parallelization switch configured for connecting at least two power stages in parallel. The invention further relates to a respective method.

BRIEF DESCRIPTION OF THE SEVERAL VIEWS OF THE DRAWING(S)

The various aspects of the disclosed embodiments will be apparent from and elucidated with reference to the figures.

DETAILED DESCRIPTION OF THE INVENTION

Figure 1:
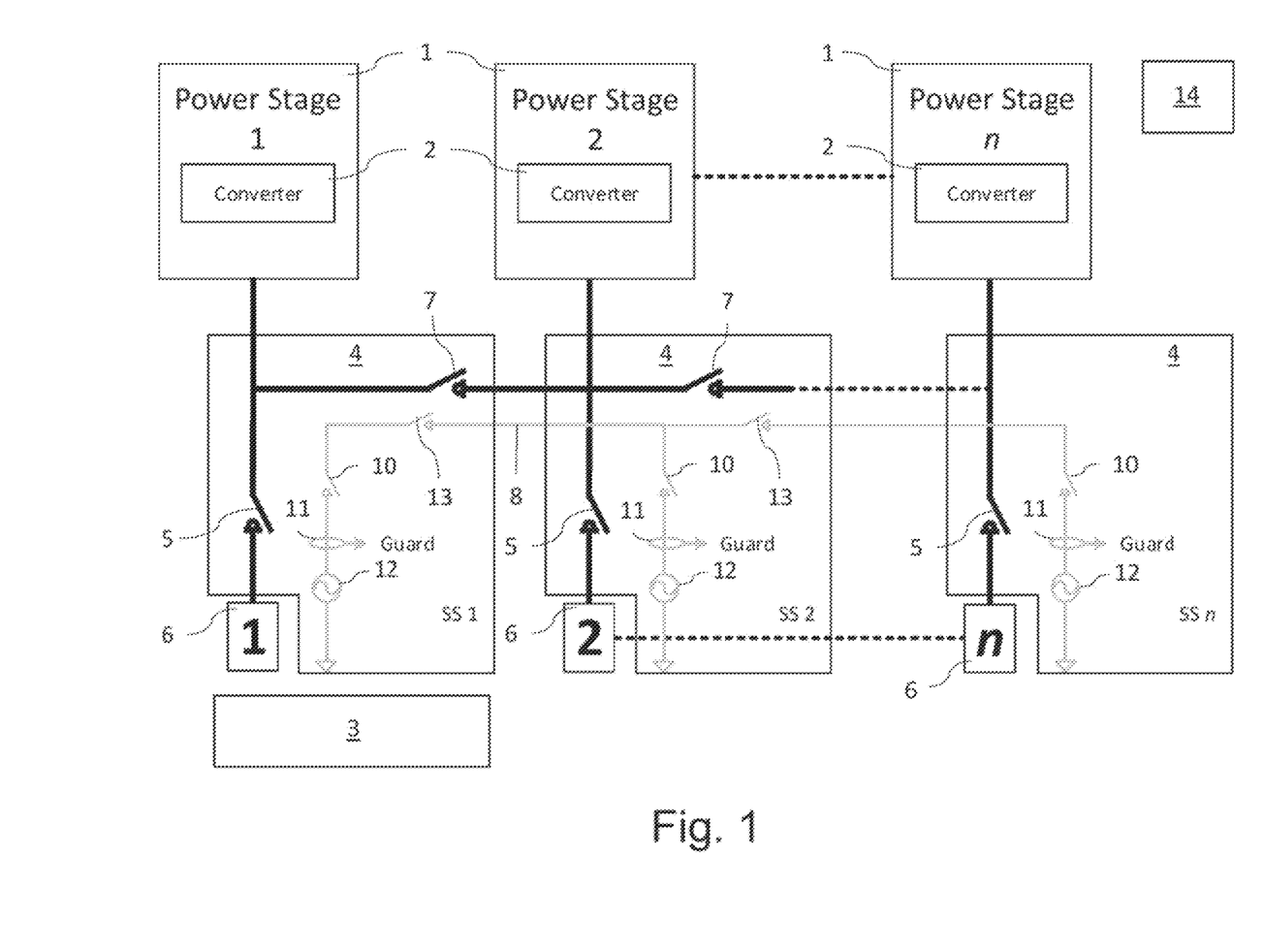
FIG. 1 is a schematic diagram of an electrical vehicle charging system comprising a plurality of power stages and outlets according to an exemplary embodiment of the present disclosure.
Figure 2:
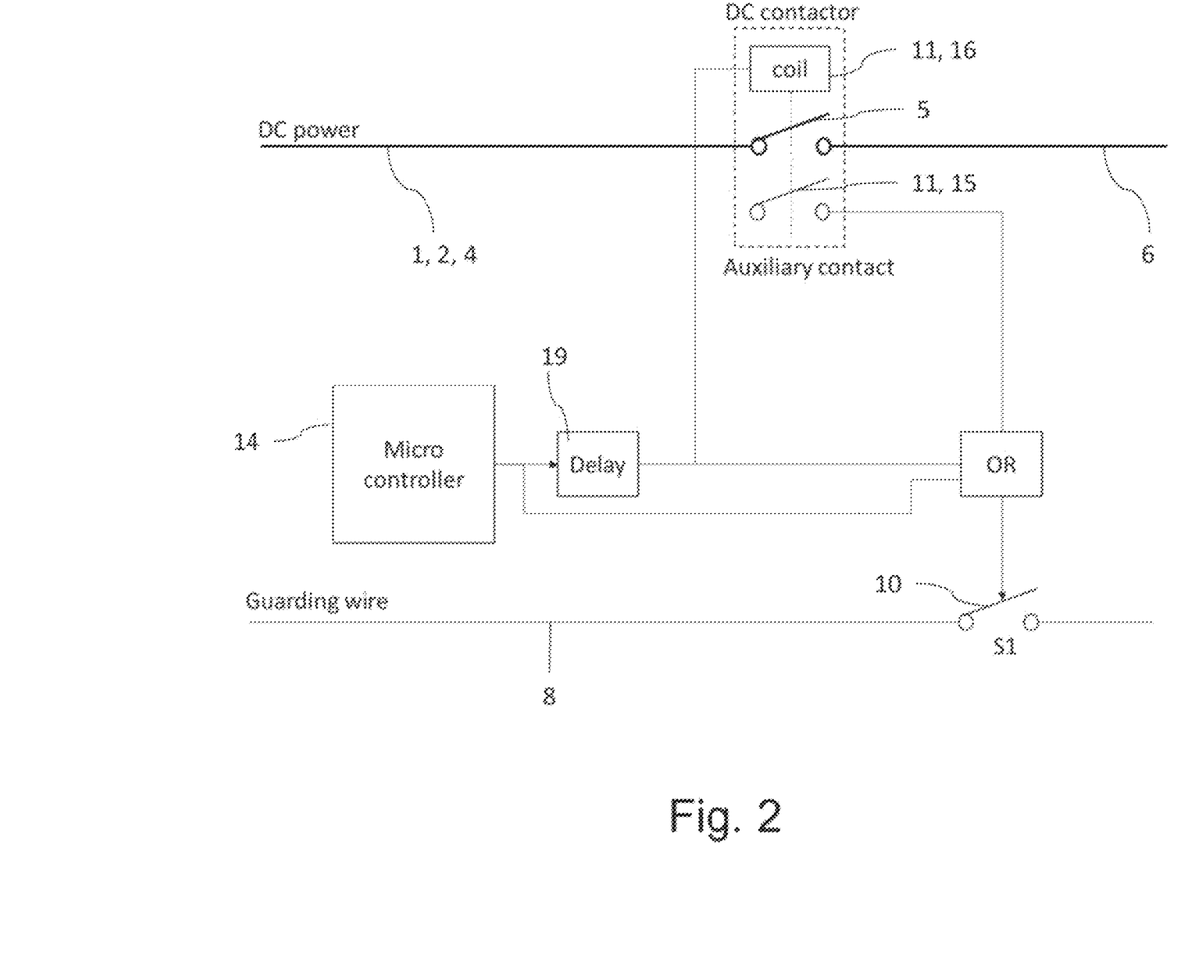
FIG. 2 illustrates an outlet of FIG. 1 in a different schematic view.

FIG. 1 shows an electrical vehicle charging system according to an exemplary embodiment in a schematic view. The electrical vehicle charging system comprises a plurality of power stages 1, referred to as 'Power Stage 1, Power Stage 2, . . . , Power Stage n', which are each connected to an AC, alternating current, grid, not shown, for receiving electrical energy. Each power stage 1 comprises a converter 2 for converting AC received from the AC grid to DC, direct current, for providing electrical energy to charge an electrical vehicle 3.

The electrical vehicle charging system further comprises a plurality of outlets 4, whereby each one outlet 4 is associated to each one power stage 2 and therefore electrically connected to the respective converter 2 of the respective power stage 2. Each outlet 4 comprises an outlet switch 4, which is configured for connecting the electrical vehicle 3 via an outlet port 6, referred to as '1, 2, . . . , n' to the respective power stage 1 such that the electrical vehicle 3 can be charged with electrical energy. Each outlet 4 further comprises a parallelization switch 7, which is con-figured for connecting two power stages 1 in parallel such a single electrical vehicle 3 can be charged via electrical energy received from the respective parallel connected power stages 1. The n-th outlet 4 may not comprise such parallelization switch 7. The parallelization switch 7 can be provided within the outlet 4 as shown in FIG. 1, between the outlet 4 and the power stage 1 or within the power stage 1, not shown.

The electrical vehicle charging system even further comprises a guarding wire 8, which is basically an electrical connection such as a cable that runs in parallel along the complete DC path formed by all outlet switches 5 and all parallelization switches 7, whereby ends of the guarding wire 8 associated respectively near the outlet ports 6 are connected to ground. The guarding wire 8 a plurality of outlet guarding switches 10, a plurality of current sensors 11, a plurality of voltage sources 12 and a plurality of parallelization guarding switches 13. Each one volt-age source 12, each one current sensor 11, each one outlet guarding switch 10 and each parallelization guarding switch 13, in case present, is associated to each one outlet 4 i.e. installed arranged and installed within said outlet 4.

Specifically, each one outlet guarding switch 10 is associated and therefore installed close to each one respective outlet switch 5 such that by switching the outlet switch 5 the respective outlet guarding switch 10 is switched in parallel. Further, all parallelization guarding switches 13 are associated and therefore installed close to each one respective parallelization switch 7 such that by switching the parallelization switch 7 the respective parallelization guarding switch 13 is switched in parallel. Each one voltage source 12 is installed in the current path between ground and the respective outlet guarding switch 10, whereby each one current sensor 11 is arranged in the current path between the respective voltage source 12 and outlet guarding switch 10 such that each one voltage source 12 feeds the guarding wire 8 and thereby the respective current sensor 11 and the respective outlet guarding switch 10. In this way, the guarding wire 8 comprises switches 10, 13 on exactly the same position as the switches 5, 7 in the DC path.

Finally, the electrical vehicle charging system comprises a computerized control device 14, which is electrically connected to all current sensors 11. The control device 14 measures the current within the guarding wire 8 via the current sensors 11, and, if at least one of the current sensors 11 measures a current greater zero, opens all outlet switches 5 and all parallelization switches 7. If a current greater zero is measure in the guarding wire 8 a current path has been established between different outlets 4 the electrical vehicle charging system goes into a fail-safe state by opening all switches 5, 7. Outlet switches 5, parallelization switches 7, outlet guarding switches 10 and parallelization guarding switches 13 are each provided as contactors, whereby, referring to FIG. 4, the outlet guarding switch 11 and/or the parallelization guarding switch 13 can be associated to the outlet switch 5 and/or the parallelization switch 13 via an auxiliary contact 15 and/or a coil 16 of the outlet switch 5 and/or of the parallelization guarding switch 13.

Figure 3:
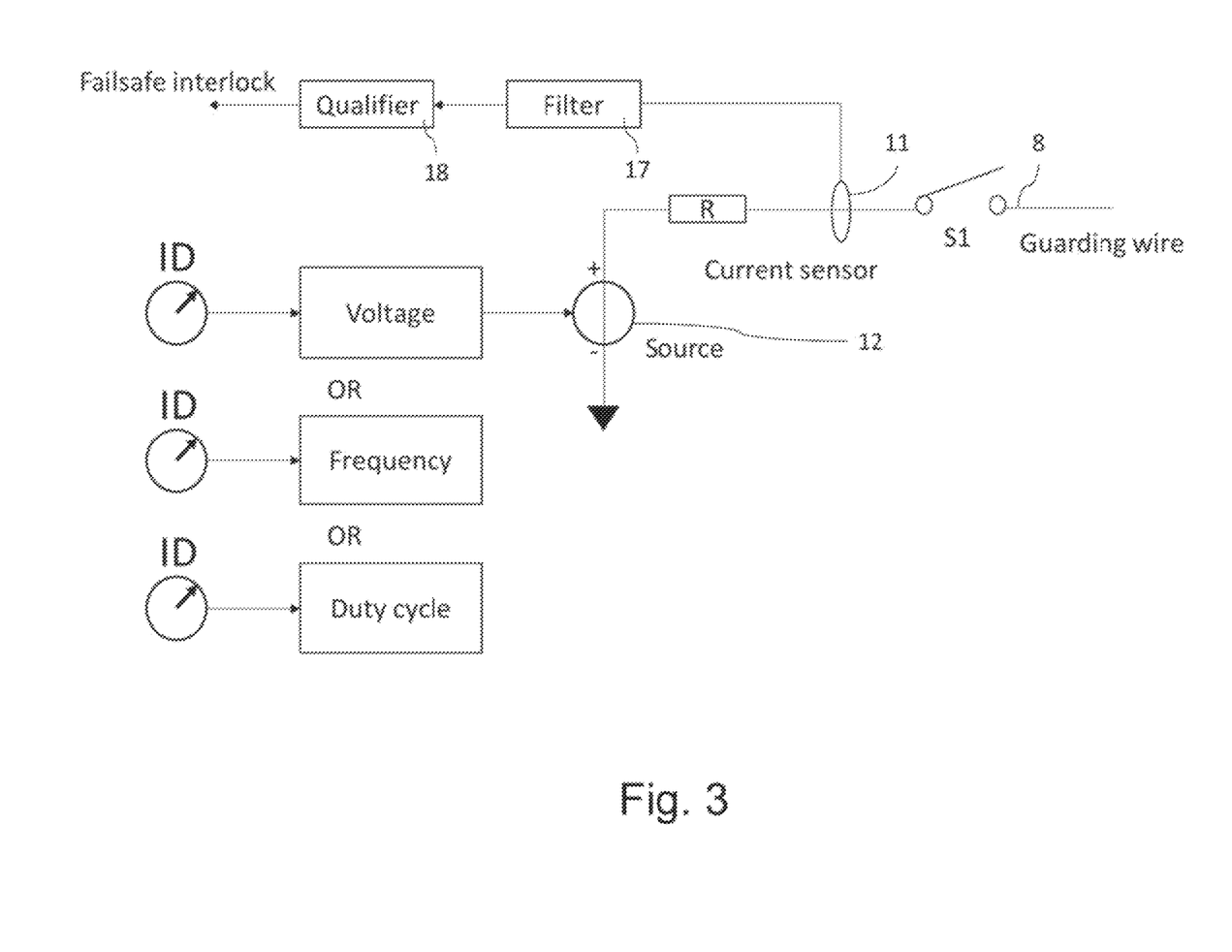
FIG. 3 illustrates the outlet of FIG. 1 in a further different schematic view.

The guarding wire 8 is fed by the voltage sources with an unique voltage, an unique frequency and/or an unique duty cycle for each outlet 4, see FIG. 3. The unique frequency may comprise 50% duty cycle and a square wave for each out-let 4. The unique duty cycle may comprise a fixed frequency for each outlet 4. Each outlet 4 may comprise a hardware ID switch such as a Dip or rotary switch for configuring the unique voltage, an unique frequency and/or an unique duty cycle. Thereby the ID can also be used for node identification. Each current sensor 11 comprises a filter element 17 and a qualifier element 18 connected in series between the current sensor 11 and the control device 14. Such way in case unique duty cycle or unique frequency current output is a pulse shape and de-pends on the overlap of two voltage sources 11 such that respective filtering is required.

A turn-on delay 19 avoids switching on the outlet switches 5 and the parallelization switches 7 in case of a failure such that the outlet switches 5 and the parallelization switches 7 are only closed after a pre-defined timespan. Thus, in order to make sure that the outlet switches 5 and the parallelization switches 7 never switch on in case of a "collision", the turn-on delay 19 of the outlet switches 5 and the parallelization switches 7 must be higher than a current filter time constant together with a failsafe interlock response time. If a pulse waveform is used, it de-pends on the phase between signals how long it takes before current is detected. Thus, choosing higher frequency steps or duty cycle steps per ID helps to speed up.

Figure 4:
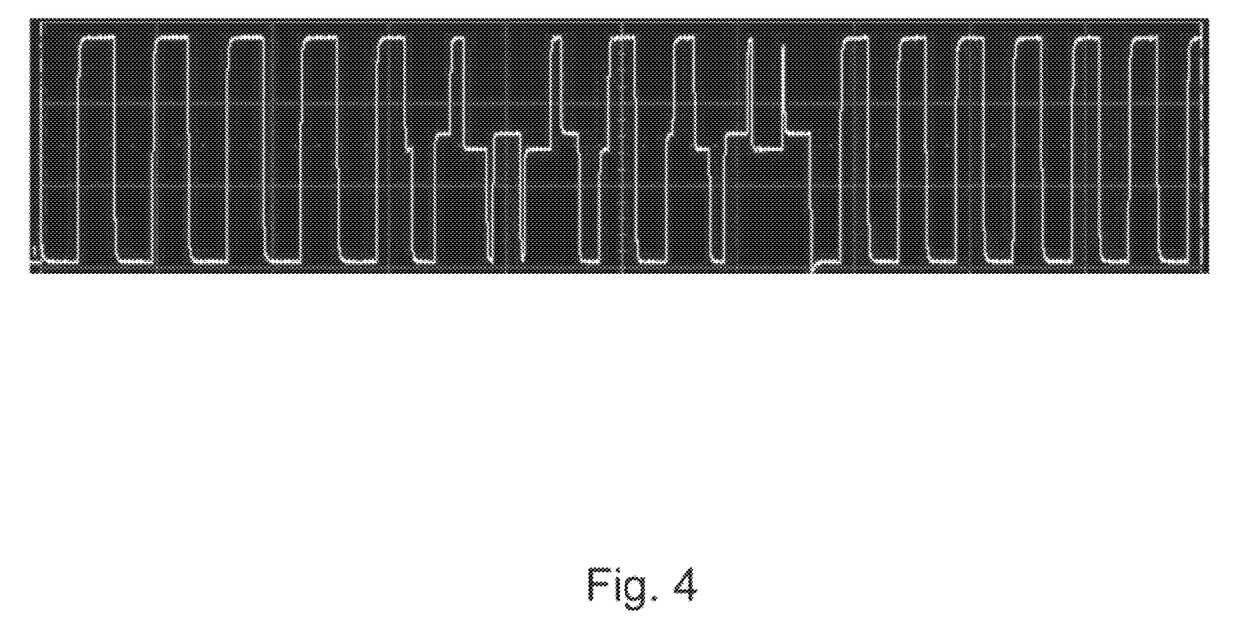
FIG. 4 illustrates a signal measured on the guarding wire according to an exemplary embodiment in a schematic view.

FIG. 4 shows a signal measured on the DC guarding wire 8. The plot starts where one outlet 4 has its switches 5, 7 closed. A low frequency voltage source 12 is connected to the guarding wire 8. No current will flow because there is no other voltage source 12 active neither there is any other impedance where current can flow. At a certain point in time "collisions" can be seen. At the moments where the signal is around the middle, the voltage sources 12 have opposite signal level and a current will flow. After some time the current is detected. The current is the same for both outlets 4 but one of the outlets 4 detects first and will switch off its own switch 5, land so the respective guarding switch 10, 13. In this example the outlet 4 that starts also detected first as can be seen in the plot because the frequency has changed. The second outlet 4 is still connected. In this example the failsafe interlock was not used for the sake of understanding the guarding signal.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

IN one general aspect, therefore, the disclosure describes an improved solution for detecting paralleling multiple electric vehicles within a distributed switch system. In particular, an object is to provide an improved solution for switch monitoring in an electrical vehicle charging system in particular in order to determine whether the contactor is welded in such case preventing the system from damage.

Thus, the object is solved by an electrical vehicle charging system comprising a plurality of power stages each configured for providing electrical energy to charge an electrical vehicle,     a plurality of outlets each comprising an outlet switch configured for connecting the electrical vehicle to the respective power stage for charging the electrical vehicle,     at least one parallelization switch configured for connecting at least two power stages in parallel,     a guarding wire running in parallel along a DC path formed by the outlet switches and the at least one parallelization switch and comprising a plurality of outlet guarding switches, a plurality of current sensors, a plurality of voltage sources and at least one parallelization guarding switch, and a control device connected to the current sensors, whereby     each one voltage source, each one current sensor and each one outlet guarding switch is associated to each one outlet,     each one outlet guarding switch is associated to each one outlet switch such that switching the outlet switch switches the outlet guarding switch,     the at least one parallelization guarding switch is associated to the at least one parallelization switch such that switching the parallelization switch switches the parallelization guarding switch,     each one voltage source is configured for feeding the guarding wire and thereby the respective current sensor and the respective outlet guarding switch, and     the control device is configured for opening at least one of the outlet switches and/or the at least one parallelization switch if at least one of the current sensors measures a current greater zero.

In one aspect, the disclosed embodiments provide a guarding wire that runs along the DC path formed by the outlet switches and the at least one parallelization switch having switches i.e. the plurality of outlet guarding switches and the at least one parallelization guarding switch preferably on exactly the same position as in the DC path respectively as the plurality of outlet switches and the at least one parallelization switch. At the outlets the voltage sources 'mimic' a respective battery of the electrical vehicle. Such way the guarding wire kind of 'mirrors' the DC path. If a current is measured in the guarding wire this means that there is a current path between outlets such that the system should go into a fail-safe state by opening at least one of the outlet switches and/or the at least one parallelization switch. Thus, the proposed solution provides a simple, reliant and cost-effective solution for protecting an electrical vehicle, EV, charging infrastructure with multiple outlets and dynamic power routing against an unintended parallel connection of two or more EV batteries. In case of control software fails or DC contactors provided within the outlet switches and/or the at least one parallelization switch get welded, the proposed system detects such event and prevents shorting a DC bus defined by the DC path between battery terminals of two EVs. Thus, the proposed solution avoids situations, in case of parallel battery connection, where the current increases to a level exceeding a maximum battery current ratings such that overloading, overheating and/or boiling of the battery, and frequently battery explosion is avoided. In other words the invention provides a solution for paralleling power stages, while avoiding paralleling outlets being caused for example by contactor malfunction such as welding or software error. Each parallelization switch can be configured for connecting two power stages in parallel.

The electrical vehicle charging system can be generally provided as an electric vehicle supply equipment, EVSE, also referred to as electric vehicle, EV, charging station, electric recharging point, charging point, charge point, charge post or electronic charging station, ECS. The EVSE is an element in an infrastructure that supplies electric energy for recharging of electric vehicles, including electric cars, neighbourhood electric vehicles and plug-in hybrids, via a charging cable and a charging connector to the EV. EVSEs usually comply with standards for electric vehicle fast charging, such as the so-called Combined Charging System, CCS, protocol according to IEC 61851-23 and SAE J1772 standard for charging electric vehicles both in the US and in the European Union, EU. The Combined Charging System, CCS, protocol is a fast charging method for charging electric vehicles delivering high-voltage direct current via a charging connector derived from SAE J1772 standard (IEC Type 1) or IEC Type 2 connector. Automobile manufactures that support CCS include Jaguar, Volkswagen, General Motors, BMW, Daimler, Ford, FCA, Tesla and Hyundai. The CSS standard is con-trolled by the so called CharIN consortium. Besides other protocols such as, for example, CHAdeMO, as abbreviation of CHArge de Move, or GB/T, in particular according to 20234.3-2011 standard. The proposed solution can be advantageously used with even higher charging currents such as or more than 500A, 600A or 3000A, voltages such as or higher 1000V, 1500V or 3000V and/or in combination with newer standards not yet defined requiring higher currents.

Each power stage may comprise a converter and/or a transformer connected to an AC, alternating current, grid for receiving electrical energy, which is transformed and/or converted to DC, direct current, for charging the battery of the electrical vehicle. The electric vehicle can be provided as a motor car, a bus, a van, a truck, a tractor or any other electrically powered vehicle. Each outlet may comprise an outlet port, to which the charging cable is connected, for connecting to the electrical vehicle via the charging connector. The outlet may be arranged distant to the power stage, for example 10 or 30 meters distant. The outlet switch and/or the parallelization switch can be provided as contactor and/or can be provided within the outlet, in case of the parallelization switch between two outlets and/or associated to a respective power stage.

For example, if 5 power stages and 5 respective outlets are provided, the system may comprise 5 outlet switches and 4 parallelization switches. Such way, if all 4 parallelization switches are closed, 1 electrical vehicle can be charged by 5 power stages such wise connected in parallel. Alternatively, the number of power stages can be greater than the number of outlets. The guarding wire can be provided as an ordinary wire, which preferably runs close to and/or along the complete DC path such wise 'mimicking' the DC path. The switches of the guarding wire i.e. the outlet guarding switches and the at least one parallelization guarding switch can be provided as contactors and/or are preferably provided on exactly the same positions than the respective guarding switches and the at least one parallelization switch. In case of 5 outlet switches and 4 parallelization switches preferably the same amount i.e. 5 outlet guarding switches and 4 parallelization guarding switches are provided. Feeding the guarding wire preferably only happens if the respective DC path of a respective power stage is connected to an outlet. At that moment the guarding wire can be driven by the voltage source thereby modelling presence of the EV battery.

The guarding wire preferably 'ends' close to the outlet port connected to ground. Generally, the guarding wire does not necessarily need to be connected to ground. The guarding wire is preferably provided as a 2-wire bus, where at least one low-impedance voltage drivers as voltage sources may inject a voltage. Such way ground can be used as second conductor. The voltage source is preferably provided between ground and the current sensor, whereby the current sensor is preferably provided between the voltage source and the guarding switch. Besides that other configurations are possible. The control device is preferably provided as a computerized means, whereby a single control device can be associated to each outlet. Preferably a single control device is connected to all current sensors. That the at least one parallelization guarding switch is associated to the at least one parallelization switch respectively that each one outlet guarding switch is associated to each one outlet switch means preferably that a mechanical, logical and/or electronical connection between the respective switches exist such that the switches are switched at the same time together, with a respective delay or a bit earlier in order to detect a possible malfunction before it actually happens. In case a plurality of parallelization switches exist then preferably a plurality of respectively associated parallelization guarding switches exist as well.

According to an exemplary embodiment of the present disclosure the electrical vehicle charging system can be provided with:

a plurality of power stages each configured for providing electrical energy to charge an electrical vehicle, a plurality of outlets each providing an outlet switch configured for connecting the electrical vehicle to the respective power stage for charging the electrical vehicle, at least one parallelization switch configured for connecting at least two power stages in parallel, a guarding wire, which can be configured to mimic a DC path that formed by the outlet switches and the at least one parallelization switch, whereby the guarding wire can provide a plurality of outlet guarding switches, a plurality of current sensors, a plurality of voltage sources and at least one parallelization guarding switch, and a control device connected to the current sensors, whereby each one voltage source can be configured to model the presence of a battery of the electrical vehicle, each one outlet guarding switch and each one parallelization guarding switch can have a mechanical, logical and/or electrical connection between the respective outlet switches and parallelization switches respectively, so that corresponding switches are switched at the same time together, with a respective delay of a bit earlier in order to detect a possible malfunction before the malfunction actually happens, the voltage sources can be configured for feeding the guarding wire and thereby the respective current sensor and the respective outlet guarding switch with a unique voltage, a unique frequency, a random number and/or a unique duty cycle for each outlet, and the control device can be configured for opening at least one of the outlet switches and/or the at least one parallelization switch if at least one of the current sensors measures a current greater zero.

In a preferred implementation of the electrical vehicle charging system the control device is configured for opening all outlet switches and the at least one parallelization switch if at least one of the current sensors measures a current greater zero. Such way all switches, for example contactors, are opened for bringing the system in a safe state.

According to a further preferred implementation of the electrical vehicle charging system the voltage sources are configured for feeding the guarding wire with an unique voltage, an unique frequency and/or an unique duty cycle for each outlet. The voltage sources are configured for feeding the guarding wire using a pseudo random bit string, PRBS, generator and/or a real random generator. In another preferred implementation of the electrical vehicle charging system the voltage sources are configurable in regard to the unique voltage, the unique frequency and/or the unique duty cycle. In order to detect a current when two voltages sources are connected together, for example due to welded contactors, the voltage sources may have a unique voltage or other wave form, preferably with no or low correlation. Such wise each voltage source may feed an unique DC voltage level for each outlet, may feed an unique frequency, for example with 50% duty cycle and/or square wave for each outlet, and/or may fee an unique duty cycle, for example with fixed frequency, for each outlet. The unique voltage source waveform can be set by a hardware ID switch, for example a DIP or rotary switch.

In a further preferred implementation of the electrical vehicle charging system at least the voltage sources are provided at the outlets. Preferably the voltage sources are provided within the outlets and/or close to an outlet port of the outlets, for mimicking the DC path and/or the battery in a best manner.

In another preferred implementation of the electrical vehicle charging system the control device is configured for closing at least one of the outlet switches and/or the at least one parallelization switch after a pre-defined timespan. Such switch-on delay avoids switching the respective switch on in case of a failure. A global failsafe interlock should could the system in a safe state before the switches are switched on. The time-span can be 5 s, 10 s, 30 s, 1 min, 5 min or 10 min, for example.

In a further preferred implementation of the electrical vehicle charging system the current sensors each comprise a filter element and/or a qualifier element. Depending on which method is used for the unique voltage source, some filtering is advantageous. In case of unique duty cycle or unique frequency, the current output can be a pulse shape and depends on the overlap of the two voltage sources.

In another preferred implementation the electrical vehicle charging system comprises the filter element, whereby the timespan is greater than a time constant of the filer element. For making sure that the outlet and parallelisation switch never switch on in case of a "collision", the turn-on delay as pre-defined timespan of the respective switch is preferably higher than a current filter time constant together with the failsafe interlock response time. Furthermore, if a pulse waveform is used, it may depend on the phase between signals how long it takes before current is detected. Advantageously higher frequency steps are chosen or duty cycle steps help to speed up.

In a further preferred implementation of the electrical vehicle charging system each one outlet guarding switch is associated to each one outlet switch via an auxiliary contact and/or a coil of the outlet switch and/or the at least one parallelization guarding switch is associated to the at least one parallelization switch via an auxiliary contact and/or a coil of the parallelization switch. Such way the outlet guarding switch and/or the parallelization guarding switch may not be separate switches but rather mechanically connected to the respective switch.

According to an exemplary embodiment of the present disclosure the control device can be configured for closing at least one of the outlet switches and/or the at least one parallelization switch after a turn-on delay between the respective guarding switch and the corresponding switch.

In another preferred implementation of the electrical vehicle charging system each power stage comprises a respective converter. The converter is preferably connected to the transformer and/or to an AC grid for receiving and converting AC into DC for charging the electrical vehicle.

According to an exemplary embodiment of the present disclosure a method for and comprising any of the previously described electrical vehicle charging system can be provided, including the steps of:

feeding the guarding wire and thereby the respective current sensor and the respective outlet guarding switch by the plurality of voltage sources, and opening at least one of the outlet switches and/or the at least one parallelization switch if at least one of the current sensors measures a current greater zero.

The object is further solved by a guarding method for an electrical vehicle charging system comprising a plurality of power stages each configured for providing electrical energy to charge an electrical vehicle, a plurality of outlets each comprising an outlet switch configured for connecting the electrical vehicle to the respective power stage for charging the electrical vehicle, at least one parallelization switch configured for connecting at least two power stages in parallel, and a guarding wire running in parallel along a DC path formed by the outlet switches and the at least one parallelization switch and comprising a plurality of outlet guarding switches, a plurality of current sensors, a plurality of voltage sources and at least one parallelization guarding switch, whereby each one voltage source, each one current sensor and each one outlet guarding switch is associated to each one outlet, each one outlet guarding switch is associated to each one outlet switch such that switching the outlet switch switches the outlet guarding switch, and the at least one parallelization guarding switch is associated to the at least one parallelization switch such that switching the parallelization switch switches the parallelization guarding switch, comprising the steps of:

feeding the guarding wire and thereby the respective current sensor and the respective outlet guarding switch by the plurality of voltage sources, and opening at least one of the outlet switches and/or the at least one parallelization switch if at least one of the current sensors measures a current greater zero.

If a current is measured in the guarding wire there is an unwanted current path between different outlets so that the system goes into a fail-safe state by opening some or preferably all outlet switches and parallelization switches.

In a preferred implementation the method comprises the step of opening all outlet switches and the at least one parallelization switch if at least one of the current sensors measures a current greater zero. In another preferred implementation the method comprises the step of feeding the guarding wire with an unique voltage, an unique frequency and/or an unique duty cycle for each outlet.

In a preferred implementation the method comprises the step of configuring the voltage sources in regard to the unique voltage, the unique frequency and/or the unique duty cycle. In another preferred implementation the method comprises the step of closing at least one of the outlet switches and/or the at least one parallelization switch after a pre-defined timespan.

According to an exemplary embodiment of the present disclosure the method provides the step of closing at least one of the outlet switches and/or the at least one parallelization switch after a turn-on delay between the respective guarding switch and the corresponding switch.

Further embodiments and advantages of the method are directly and unambiguously derived by the person skilled in the art from the system as described before.

REFERENCE SIGNS LIST 1 power stage
2 converter
3 electrical vehicle
4 outlet
5 outlet switch
6 outlet port
7 parallelization switch
8 guarding wire
10 outlet guarding switch
11 current sensor
12 voltage source
13 parallelization guarding switch
14 control device
15 auxiliary contact
16 coil
17 filter element
18 qualifier element
19 turn-on delay All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An electrical vehicle charging system, comprising:
a plurality of power stages, each configured for providing electrical energy to charge an electrical vehicle,
a plurality of outlets, each comprising an outlet switch configured for connecting the electrical vehicle to a respective power stage from the plurality of power stages for charging the electrical vehicle,
at least one parallelization switch configured for connecting at least two power stages of the plurality of power stages in parallel,
a guarding wire running in parallel along a direct current (DC) path formed by the outlet switches and the at least one parallelization switch and comprising a plurality of outlet guarding switches, a plurality of current sensors, a plurality of voltage sources and at least one parallelization guarding switch, and
a control device connected to the current sensors,
wherein each one voltage source, each one current sensor and each one outlet guarding switch is associated to each one outlet, wherein each one outlet guarding switch is associated to each one outlet switch such that switching the outlet switch switches the outlet guarding switch, wherein the at least one parallelization guarding switch is associated to the at least one parallelization switch such that switching the parallelization switch switches the parallelization guarding switch, wherein each one voltage source is configured for feeding the guarding wire and thereby the respective current sensor and the respective outlet guarding switch, and wherein the control device is configured for opening at least one of the outlet switches and/or the at least one parallelization switch when at least one of the current sensors measures a current greater than zero.

2. The electrical vehicle charging system of claim 1, wherein the control device is configured for opening all outlet switches and the at least one parallelization switch when at least one of the current sensors measures a current greater than zero.

3. The electrical vehicle charging system of claim 1, wherein the voltage sources are configured for feeding the guarding wire with a unique voltage, a unique frequency, a random number generator and/or an unique duty cycle for each outlet.

4. The electrical vehicle charging system according to claim 3, wherein the voltage sources are configurable in regard to the unique voltage, the unique frequency and/or the unique duty cycle.

5. The electrical vehicle charging system according to claim 1, wherein at least the voltage sources are provided at the outlets.

6. The electrical vehicle charging system according to claim 1, wherein the control device is configured for closing at least one of the outlet switches and/or the at least one parallelization switch after a pre-defined timespan.

7. The electrical vehicle charging system of claim 1, wherein the current sensors each comprises a filter element and/or a qualifier element.

8. The electrical vehicle charging system according to claim 7, wherein the at least one current sensor comprises a filter element, and wherein the timespan is greater than a time constant of the filer element.

9. The electrical vehicle charging system according to claim 1, wherein each one outlet guarding switch is associated to each one outlet switch via an auxiliary contact and/or a coil of the outlet switch and/or the at least one parallelization guarding switch is associated to the at least one parallelization switch via an auxiliary contact and/or a coil of the parallelization switch.

10. The electrical vehicle charging system according to claim 1, wherein each power stage comprises a respective converter.

11. A method for guarding an electrical vehicle charging system, the method comprising:

providing a plurality of power stages, each configured for providing electrical energy to charge an electrical vehicle, providing a plurality of outlets, each comprising an outlet switch configured for connecting the electrical vehicle to the respective power stage for charging the electrical vehicle, providing at least one parallelization switch configured for connecting at least two power stages in parallel, and providing a guarding wire running in parallel along a direct current (DC) path formed by the outlet switches and the at least one parallelization switch and comprising a plurality of outlet guarding switches, a plurality of current sensors, a plurality of voltage sources and at least one parallelization guarding switch, wherein each one voltage source, each one current sensor and each one outlet guarding switch is associated to each one outlet, wherein each one outlet guarding switch is associated to each one outlet switch such that switching the outlet switch switches the outlet guarding switch, and wherein the at least one parallelization guarding switch is associated to the at least one parallelization switch such that switching the parallelization switch switches the parallelization guarding switch, wherein the method comprises the steps of:

feeding the guarding wire and thereby the respective current sensor and the respective outlet guarding switch by the plurality of voltage sources, and opening at least one of the outlet switches and/or the at least one parallelization switch when at least one of the current sensors measures a current greater than zero.

12. The method according to claim 11, further comprising opening all outlet switches and the at least one parallelization switch when at least one of the current sensors measures a current greater than zero.

13. The method according to claim 11, further comprising feeding the guarding wire with a unique voltage, a unique frequency and/or a unique duty cycle for each outlet.

14. The method according to claim 13, further comprising configuring the voltage sources in regard to the unique voltage, the unique frequency and/or the unique duty cycle.

15. The method according to claim 13, further comprising closing at least one of the outlet switches and/or the at least one parallelization switch after a pre-defined timespan.

* * * * *